United States Patent [19]

Lazar, Jr.

[11] 3,972,257
[45] Aug. 3, 1976

[54] BAR STOCK SHEAR

[76] Inventor: John Daniel Lazar, Jr., 1007 River Drive, Munster, Ind. 46321

[22] Filed: Sept. 15, 1975

[21] Appl. No.: 613,237

Related U.S. Application Data

[63] Continuation of Ser. No. 532,300, Dec. 12, 1974, abandoned.

[52] U.S. Cl. ............................... 83/198; 83/560; 83/639; 83/698
[51] Int. Cl.² ..................... B26D 5/12; B26D 3/20
[58] Field of Search ............ 83/198, 560, 639, 698

[56] References Cited
UNITED STATES PATENTS

| | | | |
|---|---|---|---|
| 3,552,253 | 1/1971 | MacDonald | 83/198 X |
| 3,559,522 | 2/1971 | Valente | 83/698 X |

*Primary Examiner*—J. M. Meister
*Attorney, Agent, or Firm*—Leydig, Voit, Osann, Mayer & Holt, Ltd.

[57] ABSTRACT

A hydraulic shear for bar stock including a die housing constructed so that the forces produced by the shearing operation are absorbed by interlocking joints. The structure assures that there are no welded or bolted joints in the die housing in a position to receive the stresses resulting from the shearing operation. The shear comprises a three bolster arrangement wherein a hydraulic cylinder is positioned between a first end bolster and a center bolster and fitted into recesses provided in such bolsters. The die housing is positioned between the center bolster and the other end bolster and similarly fitted into recesses provided in those bolsters. Top and bottom plates are recessed and interfitted over the die retainer end plates to provide an interlocking construction eliminating the need for bolts and welds in the die housing. Such arrangement not only provides a strong stable unit, but also allows efficient access to the dies, such as for die changes.

18 Claims, 4 Drawing Figures

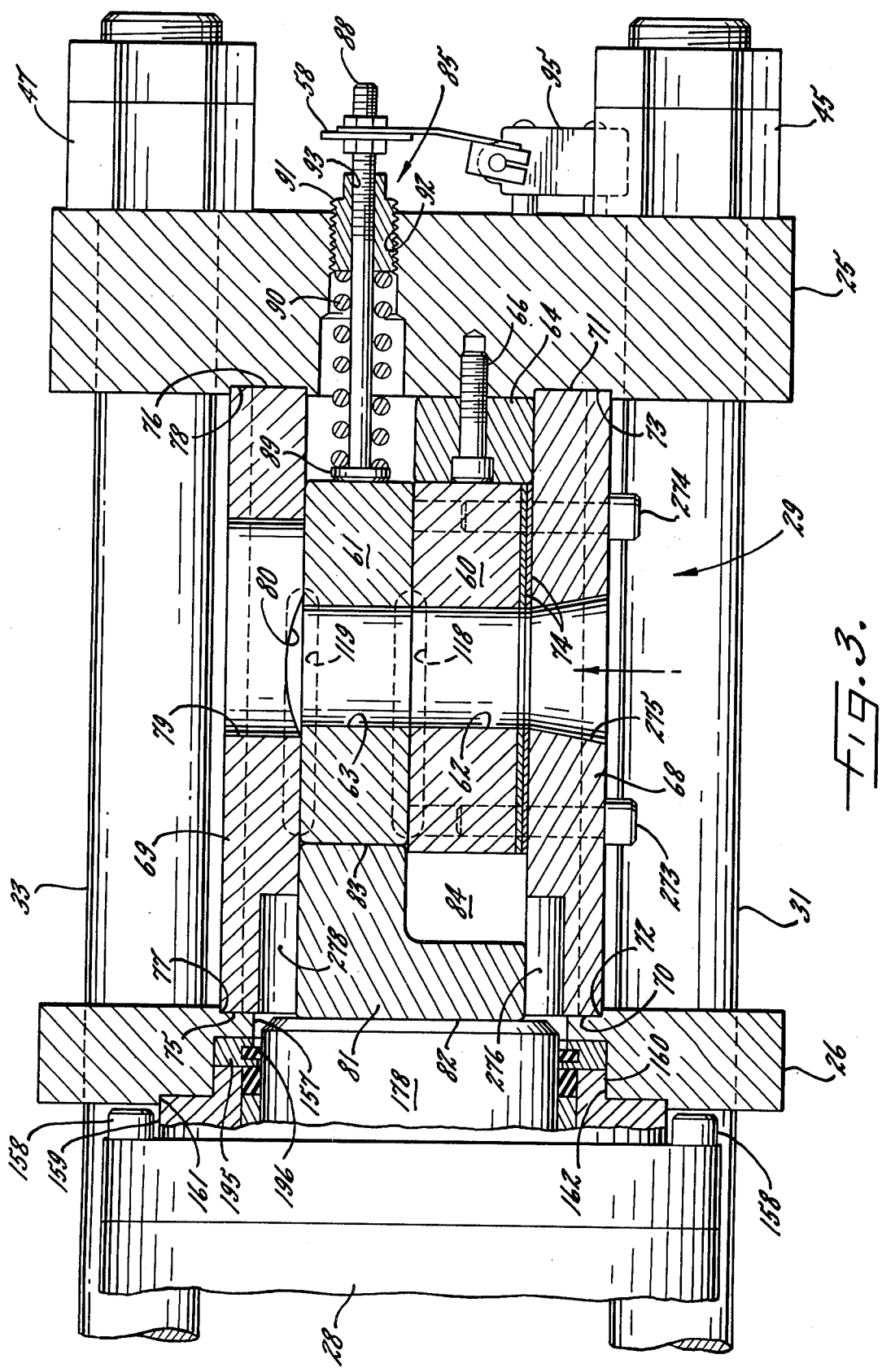

BAR STOCK SHEAR

This is a continuation of application Ser. No. 532,300 filed Dec. 12, 1974, now abandoned.

This invention relates to bar stock shears, and more particularly to those operated by hydraulically generated forces.

Hydraulic bar stock shears of the type known heretofore, while exhibiting certain advantages over impact type shears, have also included certain disadvantages. In a hydraulic shear, shearing is accomplished by a pair of dies, the stock being inserted through the dies and relative motion between the dies causing a shear. The dies are moved relative to each other under the control of a hydraulic cylinder. It will be appreciated that the die housing must be constrained to absorb forces both in the direction of die movement (caused by the hydraulic actuator), and transverse to the direction of die movement (caused by the reaction of the dies to the stock positioned therein). To absorb these forces, whose magnitudes become extremely large, die housings known heretofore have been securely bolted and/or welded together. Such arrangements continually stress the bolted or welded joints, raising the possibility of failure at any weak point in the bolted or welded configuration. Additionally, the die housings must generally be secured together at a plurality of points, resulting in arrangements which require considerable time and effort to extract the dies, such as for a die change.

Many of the hydraulic shears known heretofore utilize a pair of bolsters, with the hydraulic cylinder positioned outboard one of the bolsters and secured thereto by numerous connecting rods. Such an arrangement actually uses one of the bolsters as a cylinder end cap, causing the hydraulic forces within the cylinder to be transmitted to the end cap bolster.

Finally, many of the hydraulic bar shears known heretofore have been configured in a vertical arrangement, making the die assembly somewhat inaccessible, and increasing the floor area needed for installing the shear.

With the foregoing in mind, it is a general aim of the present invention to provide a bar from shear of compact configuration wherein the forces resulting frm the shearing operation are efficiently absorbed by interlocking joints of the machine elements.

In carrying out that aim, it is a general object of the invention to provide a bar stock shear having bolsters formed with recesses for receiving complementary protrusions of the machine elements so as to securely restrain such elements, and wherein the highly stressed joints are of interlocked, non-bolted construction.

A detailed object of the invention is to provide a die housing for a bar stock shear wherein the housing elements are interlocked by means of interfitting protrusions and recesses so that the housing has no welded or bolted joints in a position to receive the forces resulting from a shearing operation. It is an even more detailed object to transfer the transverse forces resulting from shearing operations directly to bolster elements by interfitting major elements of the die housing assembly into recesses in the bolster elements. An additional object is to provide such a die housing wherein the dies may be efficiently removed or interchanged in a simplified manner.

According to another aspect of the invention, it is an object to isolate the hydraulic forces generated within the hydraulic cylinder from the shearing forces absorbed by the bolsters by providing a hydraulic cylinder of unitary construction wherein the end caps do not rely upon the bolsters for their structural integrity. Thus, it is a general aim to provide a bar stock shear which is reliable, compact, and easily serviceable.

Other objects and advantages will become apparent from the following detailed description when taken in conjunction with the drawings in which:

FIG. 3 is an enlarged section of the right-hand portion of FIG. 2 showing the die housing components with the dies in the relaxed or "feed" position.

While the invention will be described in connection with a preferred embodiment, it will be understood that there is no intent to limit it to that embodiment. On the contrary, the intent is to cover all alternatives, modifications and equivalents included within the spirit and scope of the appended claims.

Figure 1:
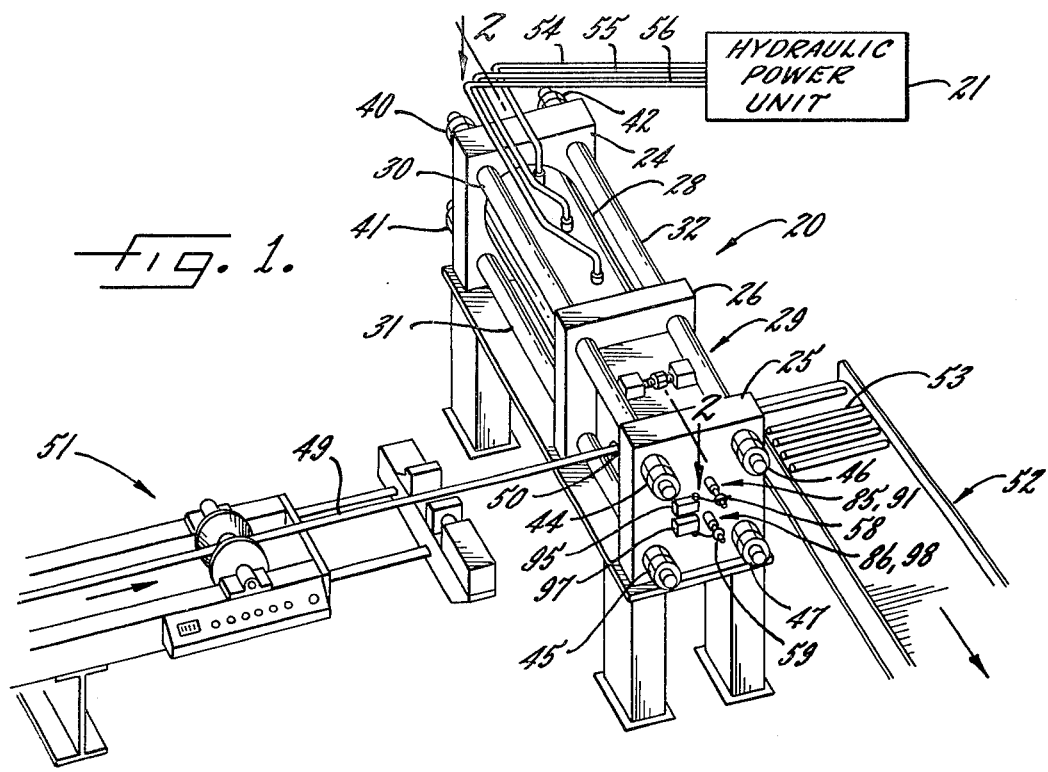
FIG. 1 is a partially diagrammatic perspective view showing a bar stock shear constructed in accordance with the present invention.

Turning now to the drawings, and particularly to FIG. 1, there is shown a bar stock shear constructed in accordance with the present invention. The shear, generally indicated at 20, is constructed in a horizontal configuration, and is driven by an electro-hydraulic power unit schematically indicated at 21. The power unit whose structure forms no feature of the present invention is illustrated in schematic form only. It is well known that such units may be constructed to provide hydraulic pressure to the main hydraulic cylinder, and to ancillary hydraulic components (such as the bar feed mechanism), in a sequence controlled by electrical, electronic or fluid logic components.

The bar stock shear includes a pair of end bolsters 24, 25 and a center bolster 26 forming major structural elements of the unit. Interposed between the bolsters 24 and 26 is a hydraulic cylinder 28. Similarly interposed between the bolsters 25 and 26 is the die housing assembly generally indicated at 29. Each bolster is apertured at its four corners. Inserted through the respective apertures are tie rods 30–33. The entire assembly is securely joined together by means such as hex nuts 40–47 engaging the respective ends of the tie rods and drawing the entire assembly together.

Bar stock 49 is fed into the die housing through an aperture 50 to a point adapted to engage the dies positioned within the housing 29. A bar stock feeder as diagrammatically illustrated at 51 may be provided for feeding the bar into the shear in fixed increments and securely holding the bar during the shearing operation. The particular bar feed arrangement, however, forms no part of the present invention and will not be described in detail. It is noted that many of the bar feeder elements have been omitted from the diagrammatic sketch in order to clearly illustrate the bar shear itself.

Similarly, mechanisms may be provided at the outfeed end of the bar shear for stacking, weighing, or conveying the sheared bar stock 53 to subsequent stations. The outfeed mechanism illustrated diagrammatically at 52 forms no part of the present invention and will not be described in detail.

In the illustrated embodiment, the hydraulic power unit 21 is coupled to the hydraulic cylinder 28 by three hydraulic connections 54–56. As will be described in more detail below, the particular illustrated hydraulic cylinder is of the tandem variety, having a pair of pistons contained within a single cylinder, and requiring two hydraulic lines 54, 55 for driving the power stroke, and a single hydraulic line 56 for driving the return stroke. A pair of limit switches are positioned to be actuated by die followers generally indicated at 58, 59, the switches being coupled to the electrical portion of the power unit 21 for setting the length of the power stroke, and sensing the completion of the return stroke respectively.

The structure of the exemplary bar stock shear constructed in accordance with the present invention will be described in more detail with reference to FIGS. 2–4. There it is shown that the die housing generally indicated at 29 contains a pair of cooperating dies 60, 61 having die openings 62, 63, respectively. In the illustrated embodiment the die 60 remains stationary while the die 61 is movable with respect thereto in order to accomplish a shearing operation. In operation, the die 61 is positioned so that its opening 63 coincides with the opening 62 of die 60. The bar stock is then fed through the die to a position where the length of stock extending beyond the die 60 is the length which it is desired to shear. The hydraulic cylinder 28 is then actuated to cause a power stroke, moving die 61 with respect to die 60 (to the right in FIG. 2), causing the bar to shear in a plane defined at the intersection of the dies. It will be appreciated that the tremendous forces generated during the power stroke must be absorbed by the machine while maintaining its structural integrity. Forces are generated which are axial with respect to the axis of the power stroke (toward bolster 25) and transverse to such axis (tending to separate dies 60, 61).

In accordance with an important aspect of the invention, the die housing assembly is configured so that the aforementioned forces are transmitted directly to the bolsters without reliance upon bolted or welded joints. The axial forces are absorbed directly by the bolsters 24, 25, the cylinder resting directly against bolster 24 while the stationary die 60 is restrained by bolster 25. It is seen that a spacer piece 64 is affixed to the bolster 25 by bolts 65, 66, and provides an abutting surface upon which the side of die 60 rests. Alternatively, the length of die 60 (along the axis of the work stroke) may be increased to a size greater than that of die 61 so that die 60 rests directly upon bolster 25, thereby eliminating the need for spacer piece 64.

In practicing the invention, the transverse forces resulting from a power stroke are transferred directly to the bolsters by arranging the die housing as an interlocking assembly captured within recesses formed in the bolsters. It is seen that the sides of the die housing are formed by die retainer places 68, 69 adapted to restrain the dies in the direction transverse to the axis of the power stroke. The infeed retainer plate 68 includes lateral projections 70, 71 adapted to mate recesses 72, 73 formed in the bolsters 26, 25, respectively. The projections 70, 71 may efficiently be mere extensions of the plate 68, the term projection serving to indicate that the plate 68 is longer than the length of the die housing between inner surfaces of the bolsters.

The outfeed die retainer plate 69 includes similar projections 75, 76 mating recesses 77, 78, formed in bolsters 26, 25, respectively. The longitudinal dimension of the die retainer plates 68, 69, are made closely identical so that when the bolsters are drawn together by means of hex nuts 40–47 and the tie rods 30–33, the protrusions 70, 71, 75, and 76 bottom in their respective recesses 72, 73, 77, and 78, to provide a securely interlock assembly. Thus, the transverse forces transmitted by the dies 60, 61, to the die retainer plates are transferred directly to the bolsters at the joints formed by the interlocking protrusions and recesses.

In the illustrated embodiment, the fixed die 60 is positioned at the infeed end of the die housing. In accordance with standard practice, one or more spacer plates or shims 270 may be interposed between the stationary die 60 and the infeed die retainer plate 68. The stationary die is held in position by four bolts 271–274 fitted through apertures in the die retainer plate 68 and shims 270 into tapped holes in the stationary die 60. It is emphasized that the bolts 271–274 are provided to generally maintain the position of the stationary die and not to absorb the axial forces produced during a work stroke, such forces being transmitted to bolster 25 via spacer plate 64.

The infeed die retainer plate 68 includes an aperture 275 for admitting bar stock into the die housing, the aperture being tapered, if desired, to guide the stock towards the opening 62 in the stationary die 60. Finally, the die retainer plate 68 is centrally recessed as shown at 276 to provide clearance for the piston of the hydraulic cylinder 28 when extended on a power stroke.

The die retainer plate 69 is constructed in similar fashion to plate 68, including a recess 278 for providing clearance for the piston of the hydraulic cylinder 28. The plate 69, however, requires no apertures for bolting of a die thereto, as are included in plate 68. The plate 68 is provided with an enlarged outfeed aperture 279 adapted to allow the sheared portion of stock to travel with the movable die without interference from the outfeed die retainer plate. A recess 80 is conveniently provided in the retainer plate 68 to allow debris such as a mill scale to fall through the die housing assembly, through clearances provided in the bottom plate to be described below.

In the illustrated embodiment, the movable die 61 is mounted for reciprocating movement within the die housing positioned intermediate the outfeed die retainer plate 69 and stationary die 60. As will become apparent, the movable die is supported upon the bottom plate to be described below. A pusher plate 81, generally L-shaped in horizontal cross-section, is interposed between the movable die 61 and the piston of the hydraulic cylinder 28. The pusher plate 81 is mounted within the die housing for reciprocating movement and closely fitted between the die retainer plates 68, 69. The larger face 82 of the pusher plate 81 covers the major portion of the cylinder piston, while the smaller face 83 abuts the movable die 61. An L-shaped recess 84 allows travel of the pusher plate 81 free of interference from the stationary die 60.

For returning the movable die and pusher plate to the feed position at the completion of a power stroke, return means, shown herein as spring return members 85, 86 are provided. Referring to spring return means 85, it is seen that a threaded rod 88 having a capped end 89 is provided with a coil spring 90 captured between the cap 89 and a threaded retainer piece 91. The retainer piece 91 is threaded into a tapped hole 92 in the bolster 25, and is positioned so that the spring 90 urges the movable die 61 to the "rest" or feed position wherein the aperture 63 is aligned with the aperture 62. The rod 88 freely slides in an aperture 93 in the retainer piece 91. Thus, after the completion of a power stroke when the piston of the hydraulic cylinder 28 is retracted, the spring 90 returns the movable die 61 and the pusher plate 81 to their rest position for the initiation of a subsequent power stroke. It is noted that FIG. 3 shows the dies in the rest or feed position, while FIG. 2 shows the dies extended during a power stroke. Internally threaded die follower 58 is adjustably positioned on the threaded rod 88 and cooperates with the actuator of a limit switch 95 for converting the position of the die to an electrical signal. The illustrated die follower 58 and spring return means 85 is adapted to establish the limit of the power stroke by providing an electrical impulse to the power unit 21 when the switch 95 is actuated. The die follower 59 on identical spring return means 86 is similarly adapted to indicate that the die has returned to its rest position when the switch 97 is actuated. The followers 58, 59 are adjustable upon their respective threaded rods so that the die positions may be adjusted in accordance with the specific needs of the application, such as the characteristics of the material being sheared.

Figure 4:
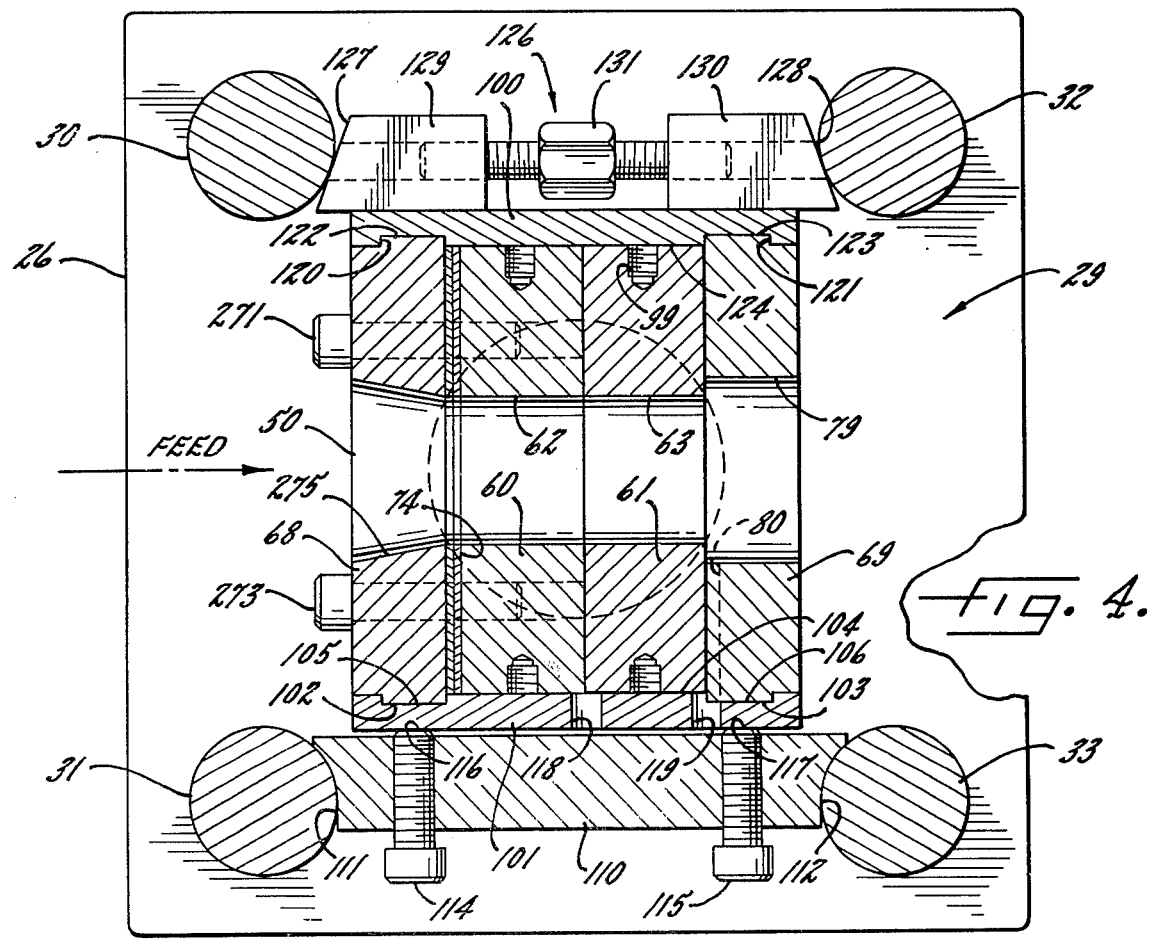
FIG. 4 is a vertical section taken generally along the lines 4—4 of FIG. 3.

In accordance with the invention, and as best shown in FIG. 4, top and bottom die housing plates 100, 101 are provided to interlock with the die retainer plates 68, 69 to provide a unitary interlocking assembly. It is seen that the plates 68 and 69 include respective protrusions 102, 103 projecting below the lower working plane of the dies generally indicated at 104. The protrusions may be machined of reduced thickness as shown in FIG. 4, or may comprise simple extensions of the retainer plates, as in the case of the protrusions mating the bolster recesses. The bottom plate 101 includes a pair of recesses 105, 106 to mate with the protrusions 102 and 103 respectively. The bottom plate 101 also provides a surface upon which the movable die 61 and pusher plate 81 are supported for reciprocation. The bottom plate itself is maintained in this interlocking position by support provided by four bolt seats threaded through a pair of cross bars supported on the tie rods 31, 33. Cross bar 110 is shown in FIG. 4 including a pair of supporting surfaces 111, 112, allowing the bar to be stably supported on tie rods 31, 33. The surfaces 111, 112 may be curved as shown, or may be formed with linear wedging surfaces as illustrated on the upper cross bar. A pair of bolts 114, 115 are threadably engaged in the cross bar 110 and are adjusted to provide a pair of seats 116, 117 maintaining the recesses of the bottom plate 101 in mated relationship with the protrusions 102, 103. Cross bar 110 and an identical cross bar (not illustrated) are spaced intermediate the bolsters 25, 26, to provide four spaced bolt seats for supporting the lower plate. The bottom plate also includes a series of apertures, such as aperture 118 positioned below the join line of the dies and aperture 119 positioned below the recess 80 for allowing mill scale to fall through the bottom plate, thereby keeping the die housing clear of debris.

In a fashion similar to the bottom plate 101, the top plate 100 is provided with a pair of recesses 120, 121 adapted to engage protrusions 122, 123 extending above the upper operating plane of the dies generally indicated at 124. The recesses 120, 121 mate with the protrusions 122, 123 and are locked in position by an upper restraining cross bar 126. Cross bar 126 includes a pair of inclined wedging surfaces 127, 128 for bearing against the tie rods 30, 32 for the purpose of restraining the top plate 100 in position over the protrusions 122, 123. However, upper cross bar 126 is of split construction including portions 129, 130 having opposed wedging surfaces 127, 128 joined by a turnbuckle arrangement 131. This arrangement allows for easy removal of the upper cross bar and top plate to allow for die changes.

It will be apparent from the foregoing that the die housing thus provided applies the forces resulting from a shearing operation to rigidly interfitted and interlocked joints, eliminating the need for welded or bolted joints at the major stress points in the die housing. The transverse forces are applied via the protrusions in the die retainer end plates 68 and 69 directly to the bolsters 25, 26, while the grooved interlocked top and bottom plates serve to restrain the end plates from flexing.

Not only does the described structure yield increased rigidity as set forth in detail above, but it also allows efficient change over because of the ease of access to the dies and associated components. A die change is simply accomplished in the illustrated quick change die housing by performing the following operations: The turnbuckle 131 is rotated to release the upper cross bar 126. The cross bar is then removed, and the top plate 100 is lifted off the side plates 68, 69. The spring return means 85, 86 are adjusted to a position out of contact with the movable die by rotating the retainer pieces 91, 98. The movable die 61 may then be lifted from the die housing. To facilitate such removal, a tapped hole 99 is provided in the top of the die for allowing the insertion of a lifting member such as an eye bolt. The four bolts 271–274 are then removed, freeing the fixed die 60. The die 60 is then lifted in a similar fashion to die 61. The spacer plates or shims 270 are also free for removal. Thus, new dies may be easily inserted, the die housing reassembled, and the machine placed back in service in a minimum of time and with a minimum of effort.

In practicing the invention a hydraulic cylinder 28 is provided for driving the movable die to accomplish a power stroke, and is rigidly captured between a pair of bolsters in a manner similar to the die housing 29. The particular cylinder illustrated in the figures is of the tandem variety, providing a pair of pistons positioned within separate chambers in a single cylindrical housing. However, it should be appreciated that bar stock shears according to the present invention may be constructed using hydraulic cylinders of the more conventional single piston variety, and accordingly, the invention is not intended to be limited to tandem type cylinders.

Figure 2:
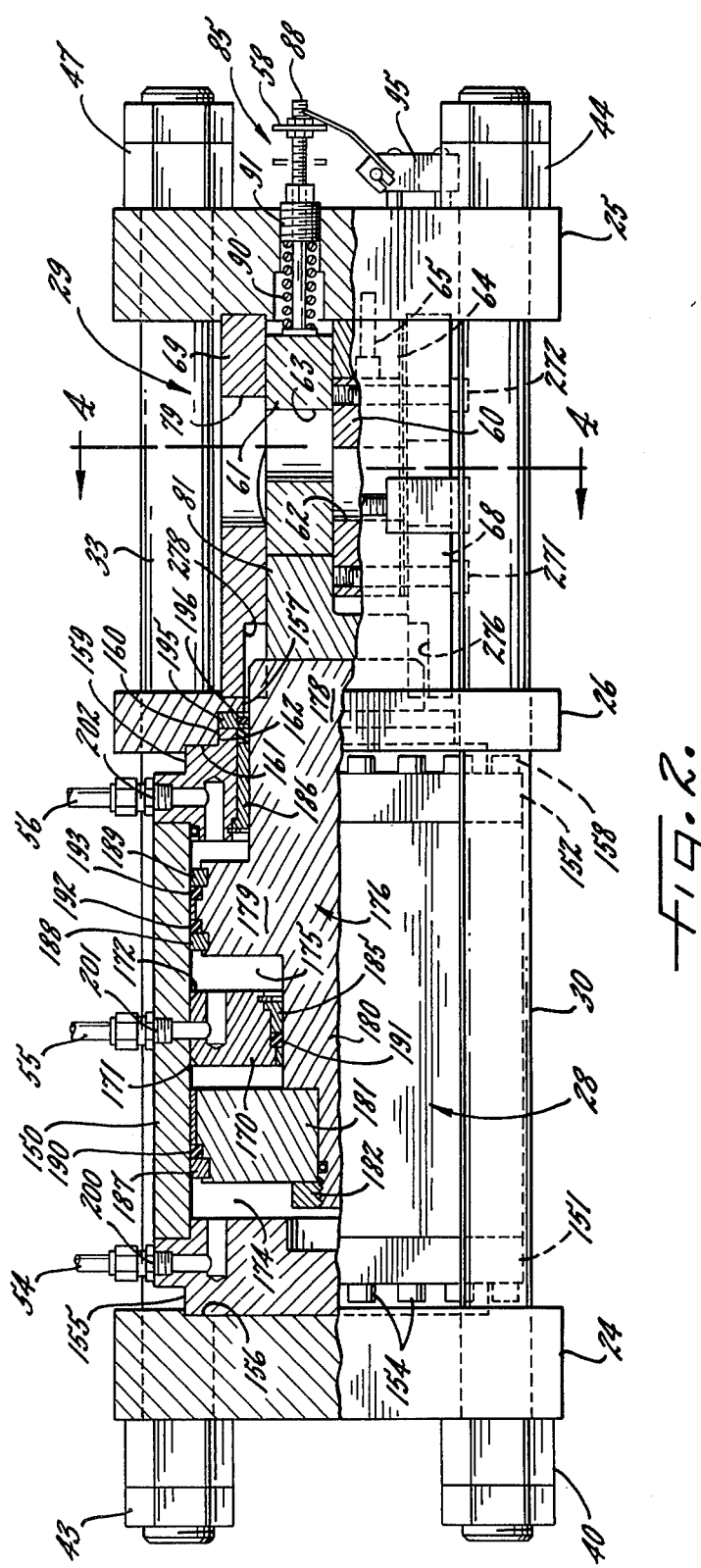
FIG. 2 is a partial sectional view taken generally along the lines 2—2 of FIG. 1 with the position of the hydraulic fittings rotated 90° for clarity of showing.

Turning now to the cylinder illustrated in FIG. 2, there is shown a cylindrical casing 150 closed at its ends by end caps 151, 152. The end cap 151 is bolted to the casing 150 by a series of bolts 154, and includes a cylindrical protrusion 155 of reduced diameter extending beyond the bolt heads as illustrated. The bolster 24 includes a recess 156 into which the protrusion 155 snugly fits thereby to restrain the rear portion of the cylinder within the bolster 24.

The rod end of the cylinder is closed by end cap 152 which is similarly bolted to the cylindrical casing 150 by a series of bolts 158. The end cap 152 has two reduced diameter portions 159, 160 which mate corresponding recesses 161, 162 in the center bolster 26. The center bolster 26 is apertured at 157 as shown to allow the piston rod to enter the die housing 29.

Located in an intermediate position within the casing of the cylinder 150 is a separator plate 170 securely fixed into position by means such as welded joints, 171, 172. The separator plate 170 serves to separate the space enclosed within the casing into a pair of independent chambers 174, 175. The main piston assembly generally indicated at 176 is formed to provide an extended rod portion 178, and enlarged piston portion 179, and a rearwardly extending tail portion 180 projecting through an aperture in the separator plate 170. Seated upon a reduced diameter portion of the tail section 180 is a second cylinder head 181 which is maintained in position on the tail portion by means such as the threaded retainer 182 pinned to tail section 180. The piston assembly is mounted for reciprocation by means of shaft bearings 185, 186 and piston support rings 187, 188 and 189. Hydraulic seals 190-193 are positioned in a conventional manner to provide the necessary pressure sealing. A bearing retainer cap 195 is placed over the end cap 152 and surrounding the piston rod 178 and includes a wiper 196 for preventing foreign material from being drawn into the piston assembly.

A pair of hydraulic fittings 200, 201 are provided to be coupled to the lines 54, 55 (FIG. 1) for driving the cylinder on a power stroke. It will be appreciated that when hydraulic fluid is provided to both fittings 200 and 201, pressure is applied to both pistons 179 and 181, thereby increasing the effective cylinder area. If desired, when shearing lighter stock, the power unit may be adapted to provide hydraulic fluid to only one of the fittings, such as fitting 201, decreasing the amount of fluid to be pumped and thereby increasing the speed of operation. A hydraulic fitting 202 is provided to be coupled to hydraulic line 56 (FIG. 1) and is adapted when provided with hydraulic fluid under pressure to cause the retraction of the piston. It is seen that the greater portion of the surface area of the face of the piston 178 is covered by the pusher plate 81 so that the force generated by the cylinder is effectively transmitted through the pusher plate 81 to the movable die 61.

As a further feature of the invention, the cylinder thus described is adapted to maintain its structural integrity independently of the bolsters 24, 26. As described above, the end caps 151, 152 are securely affixed to the casing 150 by means of bolts 154, 158. Thus, the hydraulic forces generated within the cylinder are not transmitted to the bolsters, but are taken up by the structure of the cylinder itself, thus isolating the hydraulic forces within the cylinder from the bolsters.

The ease of manufacturing a bar stock shear in accordance with the present invention will be apparent from the foregoing description. Initially, it is seen that the modular cylinder construction allows the hydraulic cylinder to be manufactured and tested independently of the shear. The main structural components of the shear, comprising the bolsters, the hydraulic cylinder, and the die housing end plates are secured in position by the hex nuts at the respective ends of the tie rods. The remaining die housing components may then be assembled after the hex nuts are properly tightened. The major weight of the assembly is carried directly by the bolsters. The bottom plate, supported in position at the lower portion of the die housing from the tie rods carries only the weight of the movable die 61 and the pusher plate 81. The weight of the stationary die is affixed to the infeed retainer plate 68 which, in turn, is secured between the bolsters 25 and 26.

The horizontal configuration of the bar stock shear, with the hydraulic cylinder positioned in the same plane as the die housing provides advantages with regard to accessibility for operation and maintenance. The compact horizontal configuration, including the tandem cylinder when required in high capacity units, also minimizes the floor area needed for installation. Finally, the horizontal arrangement may be conveniently adapted to a double ended shear configuration, with a centrally located double ended hydraulic cylinder positioned intermediate a pair of identical die housings. In such an arrangement a power stroke is achieved when the piston is driven in either direction.

It will now be apparent that what has been provided is a bar stock shear utilizing an improved interlocking construction wherein the die housing contains no welded or bolted joints in a position to receive stresses resulting from the shearing operation, the structure providing simplicity of manufacture and ease of use.

I claim as my invention:

1. A bar stock shear comprising in combination a hydraulic cylinder having a pair of end caps, first and second end bolsters, a center bolster, the first end bolster and the center bolster having recesses mating the respective end caps of the hydraulic cylinder, the hydraulic cylinder being interposed between the first end bolster and the center bolster and captured within the bolster recesses, a die housing having first and second die retainer plates forming the sides of said housing, the other side of the center bolster and the second end bolster having recesses for receiving the die retainer plates, said first and second die retainer plates having protrusions fitting into the recesses in the center bolster and the second end bolster, tie rods securely joining all the bolsters and maintaining the hydraulic cylinder and the die retainer plates within their respective recesses, the die housing including a fixed die and a movable die interposed between said die retainer plates with said movable die being mounted for reciprocation therebetween, the die retainer plates each having upper protrusions projecting above the dies and lower protrusions projecting below the dies, a bottom plate having a pair of recesses, means supporting the bottom plate from below and holding said bottom plate in position with the recesses thereof encompassing the lower protrusions of said die retainer plates, a top plate having a pair of recesses, means restraining the top plate from above and holding said top plate in position with the recesses thereof encompassing the upper protrusions of said die retainer plates, means transmitting force from the hydraulic cylinder to the movable die to perform a power stroke, the respective interfitted protrusions and recesses forming the only joints within said die housing serving to absorb the forces resulting from said power stroke.

2. The bar stock shear as set forth in claim 1 wherein the hydraulic cylinder comprises a cylindrical casing, and a piston assembly fitted within said cylindrical casing and having a piston rod projecting through one of said end caps, the end caps being securely bolted to said casing forming a unitary cylinder construction, whereby hydraulic forces produced within the cylinder are isolated from the bolsters.

3. The bar stock shear as set forth in claim 1 wherein the hydraulic cylinder comprises a cylindrical casing, separator means dividing the casing into two chambers, a piston within each chamber, said pistons being secured to a single piston rod, the end caps being bolted to the casing forming a unitary cylinder construction, the piston rod projecting through one of the end caps, and means for providing hydraulic fluid to the pistons for driving said piston rod.

4. The bar stock shear as set forth in claim 1 including spacer means interposed between the fixed die and the second end bolster adapted to transfer forces produced during the power stroke along the axis of said stroke directly to the second end bolster.

5. The bar stock shear as set forth in claim 1 wherein each bolster includes four apertures located at the respective corners of each bolster, the tie rods comprising four in number and being positioned at the respective bolster corners passing through the bolster apertures, the respective ends of each tie rod being threaded, and means engaging the threaded portions for compressing the bolsters and the interposed cylinder and die housing.

6. The bar stock shear as set forth in claim 5 including cross bars supported upon a pair of said tie rods, the cross bars including seat means for supporting the bottom plate in engagement with said lower protrusions.

7. The bar stock shear as set forth in claim 6 including cross bar means engaging a second pair of said tie rods and the top plate for restraining said top plate in engagement with the upper protrusions of the die retainer plates.

8. A die housing for a bar stock shear comprising in combination a pair of bolsters forming the ends of the die housing, infeed and outfeed die retainer plates forming the sides of the die housing, the bolsters including recesses for receiving the die retainer plates, the edges of the die retainer plates forming protrusions fitting into the bolster recessers, tie rods joining the bolsters and serving to securely fix the die retainer plates in position in the respective bolster recesses, a stationary die fixed in position within the die housing, a movable die cooperating with the stationary die and mounted for reciprocation within the die housing, the die retainer plates each including upper projections projecting above the dies and lower projections projecting below the dies, a bottom plate having a pair of recesses mating the lower projections of the die retainer plates and supported in position from below with said recesses encompassing said lower projections, a top plate having a pair of recesses mating the upper projections of said die retainer plates and restrained in position from above with said recesses encompassing said upper projections, and means for moving the movable die with respect to the stationary die to produce a power stroke, said bolsters, die retainer plates, and top and bottom plates forming an interlocking housing adapted to absorb the forces resulting from said power stroke.

9. The die housing as set forth in claim 8 wherein the means for reciprocating said movable die includes a pusher plate positioned adjacent said movable die and adapted to transmit forces to said die to accomplish the power stroke, and spring means for returning the movable die after the completion of the power stroke.

10. The die housing as set forth in claim 9 wherein the spring means includes die follower means extending from said housing for indicating the position of the movable die within said housing.

11. The die housing as set forth in claim 8 wherein four tie rods join the bolsters at the corners of said bolsters, and including lower cross bar means supported on two of said tie rods and providing seats for supporting said bottom plate, and an upper cross bar interposed between the other two of said tie rods and the upper plate for restraining said upper plate.

12. The die housing as set forth in claim 8 wherein the stationary die is restrained during said power stroke from moving along the axis of said stroke by one of said bolsters.

13. The die housing as set forth in claim 12 including a spacer block interposed between the stationary die and one of said bolsters to prevent axial movement of the stationary die during the power stroke.

14. The die housing as set forth in claim 8 wherein said infeed and outfeed die retainer plates include apertures allowing infeed and outfeed to and from the dies.

15. A quick change die housing for a bar stock shear comprising in combination a pair of bolsters forming the ends of the die housing, infeed and outfeed die retainer plates forming the sides of the die housing, the bolsters including recesses for receiving the die retainer plates, the edges of the die retainer plates forming protrusions fitting into the bolster recesses, four tie rods joining the bolsters at the corners thereof and serving to securely fix the die retainer plates in position in the respective bolster recesses, a stationary die secured to one of said die retainer plates within the die housing, the die retainer plates each including upper projections projecting above the die and lower projections projecting below the die, a bottom plate having a pair of recesses mating the lower projections of the die retainer plates, lower cross bar means supported on two of said tie rods and providing seats for supporting the bottom plate in position encompassing said lower projections, a movable die cooperating with the stationary die and mounted for reciprocation on the lower plate between the stationary die and the other die retainer plate, a top plate having a pair of recesses mating the upper projections of said die retainer plates, an upper cross bar interposed between the other two of said tie bars and the upper plate for restraining said upper plate in position encompassing said upper projections, said upper cross bar including quick release means for providing easy access to the dies within said die housing.

16. The quick change die housing as set forth in claim 15 including means for reciprocating the movable die with respect to the stationary die to produce a power stroke, the interlocking protrusions and recesses of said bolsters, said die retainer plates, and said top and bottom plates forming the only joints in the die housing serving to absorb the forces resulting from said power stroke.

17. The quick change die housing as set forth in claim 16 wherein the means for reciprocating said movable die includes a pusher plate positioned adjacent said movable die upon said lower plate and adapted to transmit forces to said die to accomplish the power stroke, and spring means for returning the movable die after the completion of the power stroke.

18. The quick change die housing as set forth in claim 16 wherein said upper cross bar is of two part construction including oppositely disposed wedging surfaces joined by a turnbuckle, adjustment of the turnbuckle serving to wedge the upper cross bar into restraining position over the top plate.

* * * * *